Jan. 28, 1958  G. L. SCREWS  2,821,311
LOG LOADING TRUCK
Filed April 30, 1956  3 Sheets-Sheet 3
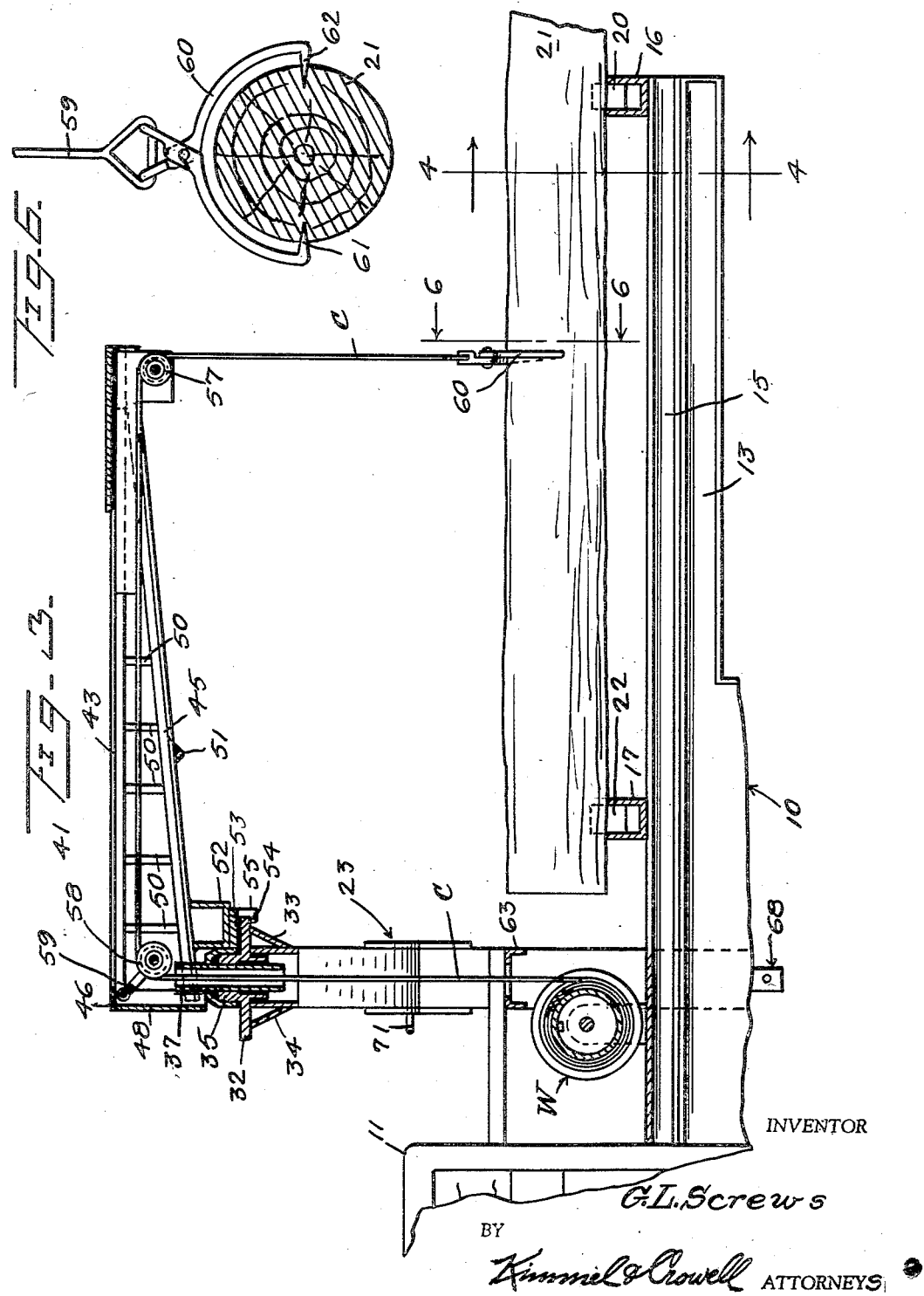
INVENTOR
G.L.Screws
BY
Kimmel & Crowell ATTORNEYS

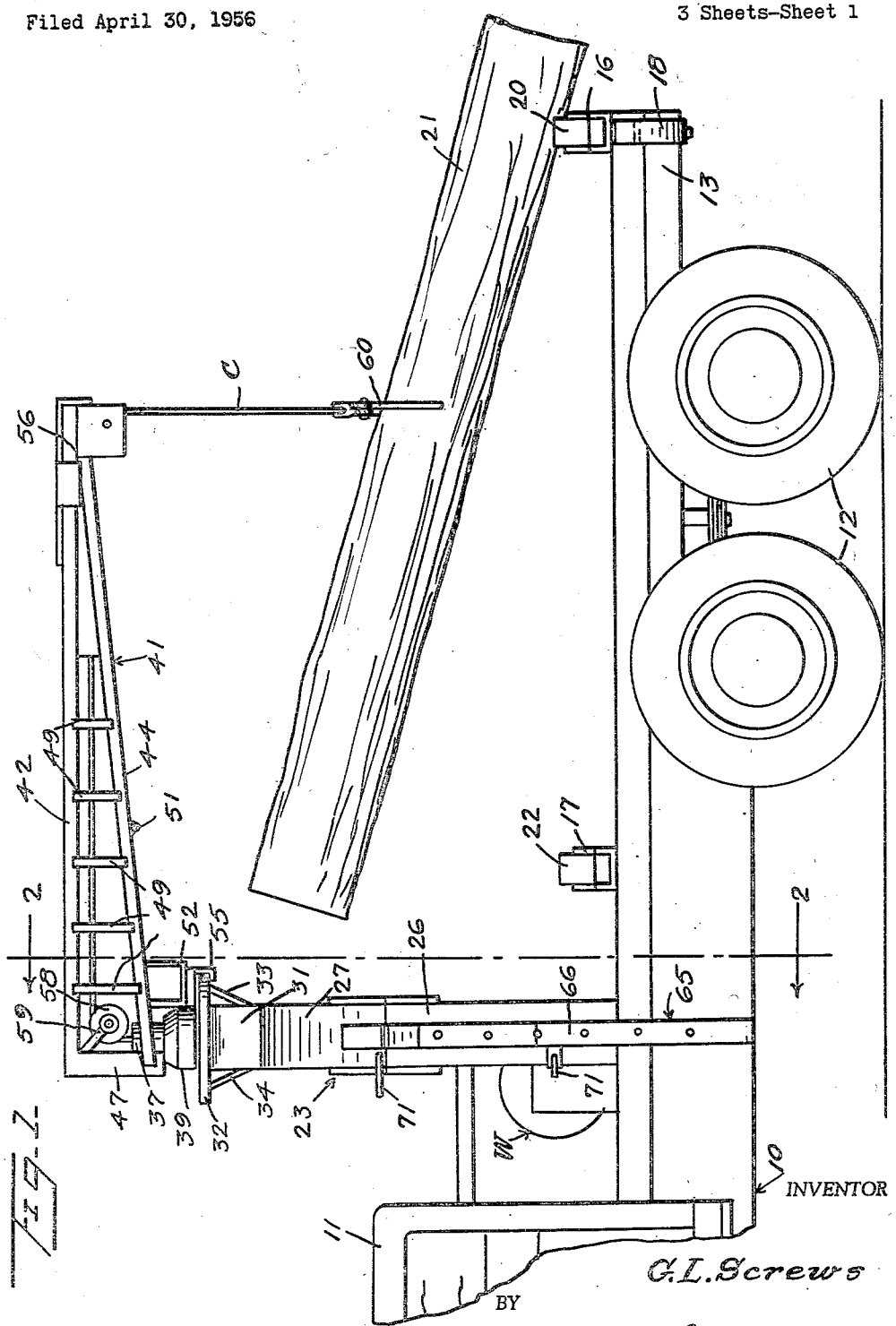

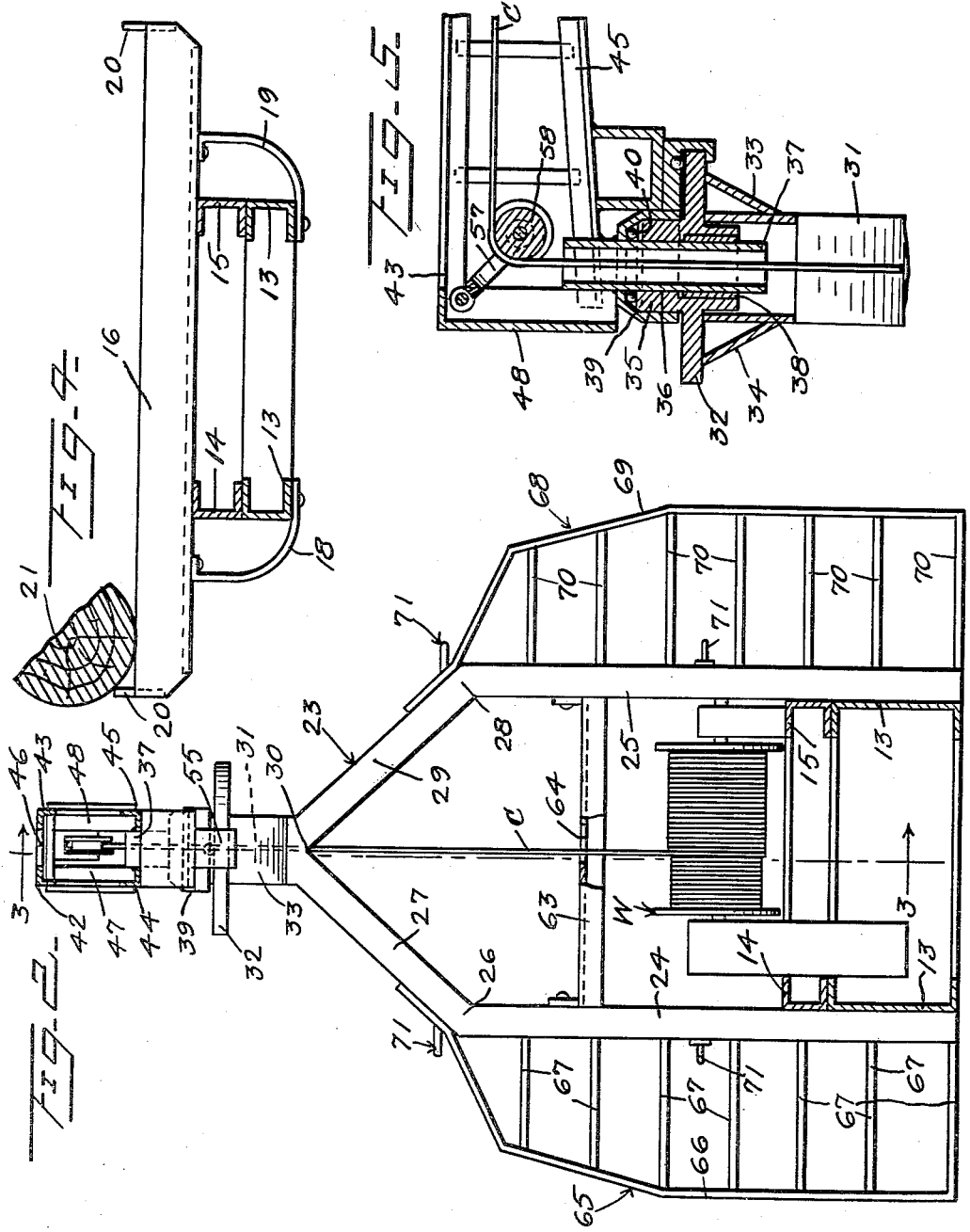

United States Patent Office 2,821,311
Patented Jan. 28, 1958

2,821,311

LOG LOADING TRUCK

Gaynor L. Screws, Dublin, Ga., assignor of twenty-five percent to Hilliard T. Hicks, Wrightsville, Ga.

Application April 30, 1956, Serial No. 581,648

2 Claims. (Cl. 214—75)

The present invention relates to log loading trucks, and more particularly to a self-propelled truck which is adapted to load logs on itself.

The primary object of the invention is to provide a log loading truck which is adapted to drag a log from the point of felling to the truck and then load the log upon the truck.

Another object of the invention is to provide a log loading truck which utilizes the power of the vehicle engine to actuate the log loading mechanism.

A further object of the invention is to provide a self-contained log loading truck which will be inexpensive to manufacture, simple to use and maintain, and durable in service.

Other objects and advantages will become apparent in the following specification when considered in the light of the attached drawings, in which:

Figure 1 is a side elevation of the invention shown partly broken away for purposes of clarity.

Figure 2 is a lateral cross-section taken along the line 2—2 of Figure 1, looking in the direction of the arrows.

Figure 3 is a vertical longitudinal cross-section taken along the line 3—3 of Figure 2, looking in the direction of the arrows.

Figure 4 is a vertical transverse cross-section taken along the line 4—4 of Figure 3, looking in the direction of the arrows.

Figure 5 is an enlarged fragmentary view similar to Figure 3 illustrating the crane mounting construction.

Figure 6 is a vertical cross-section taken along the line 6—6 of Figure 3, looking in the direction of the arrows.

Referring now to the drawings in detail wherein like reference numerals indicate like parts throughout the several figures, the reference character 10 indicates generally a truck of conventional construction having a cab 11, rear wheels 12, and a frame 13. A pair of longitudinal frame members 14 and 15 are secured to the truck frame 13, as best illustrated in Figure 4, and have mounted thereon a pair of log bolsters 16 and 17 in spaced apart parallel relation.

The bolster 16 has a pair of arcuate reinforcing straps 18 and 19 secured to the underside thereof and extending downwardly and inwardly with their inner ends secured to the underside of the frame 13. The bolster 16 has an upstanding stop 20 adjacent each end thereof which is adapted to engage a log 21, as illustrated in Figure 4, to prevent the log 21 from rolling off of the bolster 16.

The bolster 17 is constructed identically to the bolster 16 and has a pair of upstanding log retaining flanges 22 formed at opposite ends thereof identical to the flanges 20.

A framework generally indicated at 23 is secured to the truck frame 13 and consists of a pair of upright parallel spaced box girders 24 and 25. The box girder 24 is bent to slope inwardly and upwardly at 26 providing an inwardly sloped portion 27.

The girder 25 is sloped inwardly and upwardly at 28 to provide an inwardly and upwardly sloped portion 29.

The portions 27 and 29 have their upper ends abutting as at 30 and extending upwardly therefrom in parallel abutting relation forming a rectangular hollow upstanding post 31.

An annular collar 32 is secured to the upper end of the post 31 and braced thereto by means of brace webs 33 and 34 which extend downwardly and inwardly at an angle to the collar 32. The collar 32 is provided with an upstanding boss 35 having a vertical axial bore 36 extending therethrough. A vertical tube 37 extends through the bore 36 and projects above the boss 35 and below the collar 32 a substantial distance.

A bearing 38 engages between the tube 37 and the collar 32 supporting the tube 37 for rotation therein. A bearing dome 39 engages over the boss 35 and rests against a ball bearing 40 positioned on the upper surface of the boss 35, as best illustrated in Figure 5.

A crane arm generally indicated at 41 is secured to the tube 37 and to the bearing dome 39 at one end thereof, and comprises a plurality of converging angle iron members 42, 43, 44 and 45. The angle iron members 42 and 43 are connected together at one end by a cross member 46 and vertical members 47 and 48 connect the angle members 42 and 44 and angle members 43 and 45, respectively, at the end thereof overlying the framework 23.

A plurality of vertically extending braces 49 connect the angle member 42 to the angle member 44, and a plurality of similar vertically extending members 50 connect the angle member 43 to the angle member 45. A longitudinally extending cross member 51 connects the angle member 44 to the angle member 45 intermediate its ends. A brace 52 is secured to the cross members 44 and 45 and extends downwardly toward the collar 32.

A bearing plate 53 having a bearing 54 under the bottom surface thereof engages the top surface of the collar 32. A lock member 55 engages over the peripheral edge of the collar 32 and is adapted to lock the crane 41 to the collar 32 in any adjusted position.

The outer ends of the angle members 42, 43, 44 and 45 are joined together by means of a pulley mount 56 which is welded thereto and has a pulley 57 journalled therein. A second pulley 58 is mounted by means of a pulley mount 59 in overlying relation to the tube 37.

A drum winch W of conventional construction is mounted on the frame members 14 and 15 and is adapted to be driven by any suitable means from the transmission of the truck 10.

A cable C is wound upon the drum winch W and extends upwardly through the tube 37 over the pulley 58, over the pulley 57 to a point overlying the truck 10. A pivoted log grapple 60 is secured to the terminal end of the cable C and is adapted to grip a log 21 by means of gripping hooks 61 and 62, as illustrated in Figure 6, to connect the cable C to the log 21 so that the log 21 can be controlled by the winch W.

The upright box girders 24 and 25 are connected by means of a channel brace 63 which extends transversely therebetween and is provided with an aperture 64 to permit the passage of the cable C.

The box girder 24 is braced by means of a combined reinforcement and ladder, generally indicated at 65, consisting of a vertically extending member 66 and a plurality of horizontal rung like members 67. The box girder 25 is braced by a similar combined reinforcing member and ladder 68 which consists of a vertical upright member 69 joined to the box girder 25 by a plurality of rung like horizontal braces 70.

Eyes, generally indicated at 71, are secured to the frame 23 in position to support log handling tools (not shown).

In the use and operation of the invention, the cable C is unwound from the drum winch W and the grapple 60 is moved away from the crane 41 until the log to be loaded is reached. The crane 41 is unlocked from the collar 32 to permit it to turn to align with the cable C. The grapple 60 is engagd with the log 21 and the winch W is operated drawing the cable C over the pulleys 57 and 58 pulling the log 21 to a position adjacent the truck 10. The log 21 is then lifted by means of the cable C until it overlies the bolsters 16 and 17 whereupon it is lowered onto the bolsters 16 and 17 and the grapple 60 released.

In some cases, when lifting particularly long logs 21 the inner end of the log can be engaged against the cross member 51 to provide a fulcrum so that the outer end of the log 21 can be lifted sufficiently high to permit it to be loaded onto the bolsters 16 and 17. Obviously, the unloading of logs 21 from the truck 10 can be accomplished by reversing the above operation.

Having thus described the preferred embodiment of the invention, it should be understood that numerous structural modifications and adaptations may be resorted to without departing from the scope of the appended claims.

What is claimed is:

1. A log loading attachment for trucks of the type having a chassis, front and rear wheels supporting said chassis and propulsion means mounted on said chassis; comprising a horizontal frame secured to the chassis of said truck, a pair of spaced parallel transversely extending log bolsters secured to said frame, a pair of upright spaced parallel frame members secured to said horizontal frame forwardly of said bolsters, a pair of converging portions carried on the upper ends of said upright frame members, a hollow vertically extending post secured to the upper ends of said converging portions, an annular horizontal collar secured to the upper end of said post and extending radially outwardly therefrom, a circular boss integrally formed axially on said collar and projecting upwardly therefrom, a hollow bearing dome encompassing said boss, a bearing on the upper end of said boss supporting said dome, a bearing plate secured to and extending radially from said bearing dome parallel to said annular collar, a bearing interposed between said bearing plate and said collar for supporting said bearing plate, a U-shaped lock member integrally formed on the outer end of said bearing plate engaging under the peripheral edge portion of said collar, a horizontally swingable crane arm having one end thereof secured to said bearing dome, depending means on said crane arm spaced from said one end connecting said crane arm to said bearing plate, a tubular shaft journalled in said boss and extending upwardly through said bearing dome, said tubular shaft being secured to said crane arm, a plurality of pulleys journalled in said crane arm, a winch mounted on said frame directly beneath said tubular shaft, a cable trained over said pulleys through said tubular shaft and wound on said winch, and a grapple secured to the terminal end of said cable to grip and load logs so as to be disposed longitudinally of the truck resting on said bolsters.

2. A device as claimed in claim 1 wherein a combined ladder and frame reinforcement is secured to each side of said upright frame members extending vertically therewith.

References Cited in the file of this patent

UNITED STATES PATENTS

| | | |
|---|---|---|
| 719,012 | Kennedy | Jan. 27, 1903 |
| 2,301,555 | Mantyla | Nov. 10, 1942 |
| 2,487,305 | Bridegroom | Nov. 8, 1949 |
| 2,519,119 | Dalbeck | Aug. 15, 1950 |
| 2,670,086 | Eisberg | Feb. 23, 1954 |
| 2,725,990 | Andreski | Dec. 6, 1955 |
| 2,746,629 | Sandland | May 22, 1956 |
| 2,772,795 | Cramer et al. | Dec. 4, 1956 |